United States Patent
Chen

(10) Patent No.: US 11,936,302 B2
(45) Date of Patent: Mar. 19, 2024

(54) DETECTION CIRCUIT, SWITCHING CONTROL CIRCUIT, AND POWER SUPPLY CIRCUIT

(71) Applicant: FUJI ELECTRIC CO., LTD., Kawasaki (JP)

(72) Inventor: Jian Chen, Matsumoto (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 240 days.

(21) Appl. No.: 17/584,103

(22) Filed: Jan. 25, 2022

(65) Prior Publication Data

US 2022/0149741 A1 May 12, 2022

Related U.S. Application Data

(63) Continuation of application No. PCT/JP2020/047910, filed on Dec. 22, 2020.

(30) Foreign Application Priority Data

Feb. 4, 2020 (JP) .................................. 2020-017090

(51) Int. Cl.
*H02M 3/335* (2006.01)
*G01K 7/00* (2006.01)
(Continued)

(52) U.S. Cl.
CPC .......... *H02M 3/33571* (2021.05); *G01K 7/00* (2013.01); *H02M 1/0035* (2021.05); *H02M 1/08* (2013.01); *H02M 1/327* (2021.05)

(58) Field of Classification Search
CPC ......... H02M 3/33569; H02M 3/33571; H02M 1/08; H02M 1/0035; H02M 1/327; G01K 7/00
See application file for complete search history.

(56) References Cited

U.S. PATENT DOCUMENTS 10,228,294 B2   3/2019  Bach et al.
10,277,113 B2*  4/2019  Chen .................... H02M 3/3376
(Continued)

FOREIGN PATENT DOCUMENTS

JP    2001-141572 A    5/2001
JP    2012-108087 A    6/2012
(Continued)

OTHER PUBLICATIONS

International Search Report for PCT/JP2020/047910, dated Feb. 22, 2021.

*Primary Examiner* — Adolf D Berhane
(74) *Attorney, Agent, or Firm* — Rabin & Berdo, P.C.

(57) ABSTRACT

A detection circuit including a temperature voltage generator circuit and an output circuit. The temperature voltage generator circuit generates a detection voltage corresponding to a temperature of the detection circuit based on a predetermined constant current, when a pulse signal received by the detection circuit is at a first level, and stop generating the detection voltage when the pulse signal is at a second level. The output circuit outputs a detection signal indicating whether the temperature is higher than a predetermined temperature based on the detection voltage, during a period of time between a first time that is a predetermined time period after the pulse signal reaches the first level and a second time at which the pulse signal switches from the first level to the second level, the pulse signal remaining in the first level in the period of time.

9 Claims, 9 Drawing Sheets

(51) Int. Cl.
*H02M 1/00* (2006.01)
*H02M 1/08* (2006.01)
*H02M 1/32* (2007.01)

(56) References Cited

U.S. PATENT DOCUMENTS

| | | | |
|---|---|---|---|
| 11,437,913 B2* | 9/2022 | Kobayashi | H02M 3/33569 |
| 11,742,763 B2* | 8/2023 | Matsumoto | H02M 1/08 |
| | | | 363/21.02 |
| 2012/0105132 A1 | 5/2012 | Sugiura et al. | |
| 2023/0051610 A1* | 2/2023 | Matsumoto | H02M 3/33571 |
| 2023/0253871 A1* | 8/2023 | Sugawara | H02M 1/088 |
| | | | 363/21.02 |

FOREIGN PATENT DOCUMENTS

| | | |
|---|---|---|
| JP | 2014-064392 A | 4/2014 |
| JP | 2017-163741 A | 9/2017 |
| JP | 2017-200386 A | 11/2017 |

* cited by examiner

DETECTION CIRCUIT, SWITCHING CONTROL CIRCUIT, AND POWER SUPPLY CIRCUIT

CROSS-REFERENCE TO RELATED APPLICATIONS

This is a continuation application of International Patent Application No. PCT/JP2020/047910 filed Dec. 22, 2020, which claims the benefit of priority to Japanese Patent Application No. 2020-017090 filed Feb. 4, 2020, the entire contents of each of which the entire contents of each of which are incorporated herein by reference.

BACKGROUND

Technical Field

The present disclosure relates to a detection circuit, a switching control circuit, and a power supply circuit.

Description of the Related Art

Examples of a circuit that detects the temperature in an integrated circuit include a detection circuit using a diode in general (for example, U.S. Pat. No. 10,228,294 and Japanese Patent Application Publication Nos. 2014-064392, 2017-163741, and 2017-200386).

In the detection circuit that detects the temperature based on a forward voltage of the diode, a current flows through the diode constantly. Accordingly, an output from the detection circuit is stable, but the power consumption of the detection circuit is large. On the other hand, when the detection circuit operates intermittently, an output from the detection circuit is unstable, but the power consumption of the detection circuit decreases.

SUMMARY

A first aspect of an embodiment of the present disclosure is a detection circuit that receives a pulse signal, comprising: a temperature voltage generator circuit configured to generate a detection voltage corresponding to a temperature of the detection circuit, based on a predetermined constant current, when the pulse signal is at a first level, and stop generating the detection voltage, when the pulse signal is at a second level; and an output circuit configured to output a detection signal indicating whether the temperature is higher than a predetermined temperature based on the detection voltage, during a period of time between a first time that is a predetermined time period after the pulse signal reaches the first level, and a second time at which the pulse signal switches from the first level to the second level, the pulse signal remaining in the first level in the period of time.

A second aspect of an embodiment of the present disclosure is a switching control circuit configured to control switching of a switching device that is configured to control an inductor current flowing through an inductor in a power supply circuit, the switching control circuit comprising: a determination circuit configured to determine whether a load of the power supply circuit is a light load; an oscillator circuit configured to output an oscillator signal to drive the switching device in a first mode, when the load is the light load, and to drive the switching device in a second mode, when the load is not the light load; a driver circuit configured to drive the switching device in response to the oscillator signal; a pulse generator circuit configured to generate a pulse signal; a temperature voltage generator circuit configured to generate a detection voltage corresponding to a temperature of the switching control circuit, based on a predetermined constant current, when the pulse signal is at a first level, and stop generating the detection voltage, when the pulse signal is at a second level; and an output circuit configured to output a detection signal indicating whether the temperature is higher than a predetermined temperature based on the detection voltage, during a period of time between a first time that is a predetermined time period after the pulse signal reaches the first level, and a second time at which the pulse signal switches from the first level to the second level, the pulse signal remaining in the first level in the period of time, wherein the oscillator circuit, upon receiving the detection signal indicative that the temperature is higher than the predetermined temperature, causes a switching operation of the switching device to stop.

A third aspect of an embodiment of the present disclosure is a power supply circuit, comprising: a transformer including a primary coil provided on a primary side of the power supply circuit and a secondary coil provided on a secondary side of the power supply circuit; a switching device configured to control a current in the primary coil; and a switching control circuit configured to control switching of the switching device, wherein the power supply circuit is configured to generate, on the secondary side thereof, an output voltage at a target level; and the switching control circuit includes: an oscillator circuit configured to output an oscillator signal to drive the switching device, a driver circuit configured to drive the switching device in response to the oscillator signal, a pulse generator circuit configured to generate a pulse signal, a temperature voltage generator circuit configured to generate a detection voltage corresponding to a temperature of the switching control circuit, based on a predetermined constant current, when the pulse signal is at a first level, and stop generating the detection voltage, when the pulse signal is at a second level, and an output circuit configured to output a detection signal indicating whether the temperature is higher than a predetermined temperature based on the detection voltage, during a period of time between a first time that is a predetermined time period after the pulse signal reaches the first level, and a second time at which the pulse signal switches from the first level to the second level, the pulse signal remaining in the first level in the period of time, wherein the oscillator circuit, upon receiving the detection signal indicative that the temperature is higher than the predetermined temperature, causes a switching operation of the switching device to stop.

DETAILED DESCRIPTION

At least following matters will become apparent from descriptions of the present specification and the accompanying drawings.

EMBODIMENTS

<<<Overview of Switching Power Supply Circuit 10>>>

Figure 1:
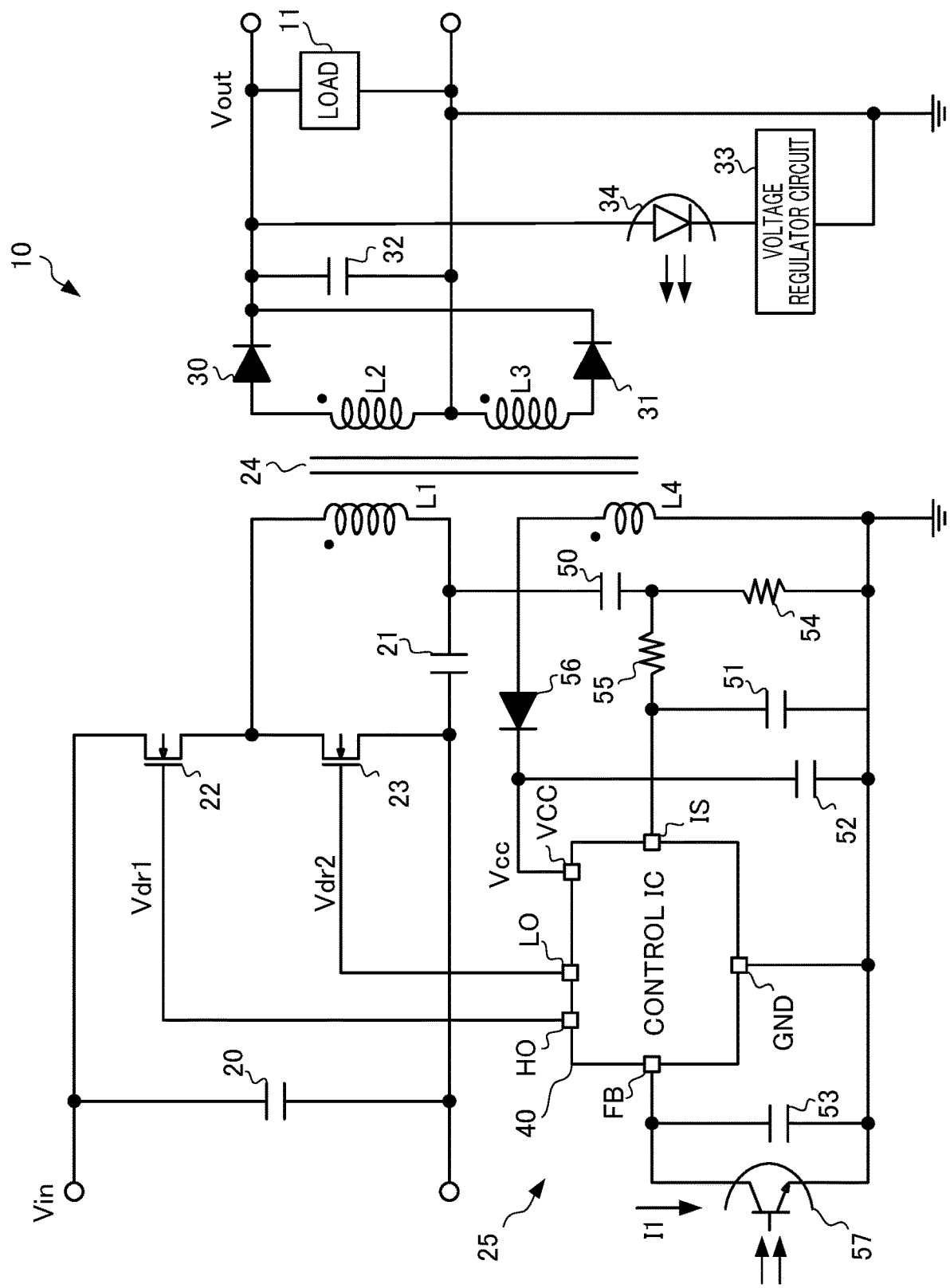
FIG. 1 is a diagram illustrating an example of a configuration of a switching power supply circuit 10.

FIG. 1 is a diagram illustrating a configuration of a switching power supply circuit 10 which is an embodiment of the present disclosure. The switching power supply circuit 10 is an LLC current resonant converter that generates an output voltage Vout of a target level at a load 11 from a predetermined input voltage Vin.

The switching power supply circuit 10 includes capacitors 20, 21, and 32, N-channel metal-oxide-semiconductor (NMOS) transistors 22 and 23, a transformer 24, a control block 25, diodes 30 and 31, a voltage regulator circuit 33, and a light-emitting diode 34.

The capacitors 20 and 21 stabilize a voltage between a power supply line that receives the input voltage Vin and a ground line on a ground side, to thereby remove noise and the like. The input voltage Vin is a direct current voltage at a predetermined level.

The NMOS transistor 22 is a high-side power transistor, and the NMOS transistor 23 is a low-side power transistor. In an embodiment of the present disclosure, the NMOS transistors 22 and 23 are used as a switching device, however, for example, a P-channel metal-oxide-semiconductor (PMOS) transistor, a bipolar transistor, an insulated gate bipolar transistor (IGBT) may be used. Note that the NMOS transistors 22 and 23 correspond to a "switching device".

The transformer 24 includes a primary coil L1, secondary coils L2 and L3, and an auxiliary coil L4, and the primary coil L1, the secondary coils L2 and L3, and the auxiliary coil L4 are insulated from each other. In the transformer 24, a voltage is generated in the secondary coils L2 and L3 on a secondary side according to a variation in voltage across the primary coil L1 on a primary side, and a voltage is generated in the auxiliary coil L4 on the primary side according to the voltages in the secondary coils L2 and L3.

The primary coil L1 has one end coupled to a source of the NMOS transistor 22 and a drain of the NMOS transistor 23, and the other end coupled to a source of the NMOS transistor 23 through the capacitor 21. Note that the primary coil L1 corresponds to an "inductor".

Accordingly, in response to start of switching of the NMOS transistors 22 and 23, the voltages in the secondary coils L2 and L3 and the auxiliary coil L4 each varies. The primary coil L1 and the secondary coils L2 and L3 are electromagnetically coupled with the same polarity, and the secondary coils L2 and L3 and the auxiliary coil L4 are also electromagnetically coupled with the same polarity.

The control block 25 is a circuit block to control the switching of the NMOS transistors 22 and 23, and details thereof will be described later.

The diodes 30 and 31 rectify the voltage in the secondary coils L2 and L3, and the capacitor 32 smooths the rectified voltage. As a result, a smoothed output voltage Vout is generated in the capacitor 32. The output voltage Vout results in a direct current voltage at the target level.

The voltage regulator circuit 33 generates a constant direct current voltage, and includes a shunt regulator, for example.

The light-emitting diode 34 emits light with an intensity corresponding to a difference between the output voltage Vout and an output from the voltage regulator circuit 33, and configures a photocoupler with a phototransistor 57 which will be described later. In an embodiment of the present disclosure, in response to a rise in the level of the output voltage Vout, the intensity of the light from the light-emitting diode 34 increases.

Note that the switching power supply circuit 10 corresponds to a "power supply circuit".

<<<Control Block 25>>>

The control block 25 includes a control IC 40, capacitors 50 to 53, resistors 54 and 55, a diode 56, and the phototransistor 57.

The control IC 40 is an integrated circuit that controls the switching of the NMOS transistors 22 and 23, and includes terminals VCC, GND, FB, IS, HO, and LO.

The terminal VCC receives a power supply voltage Vcc for operating the control IC 40. The terminal VCC is coupled to one end of the capacitor 52 having the other end grounded and to a cathode of the diode 56. Thus, the capacitor 52 is charged with a current from the diode 56, and a charge voltage of the capacitor 52 results in the power supply voltage Vcc to operate the control IC 40. The control IC 40 is activated in response to a divided voltage of the input voltage Vin being applied thereto through a terminal (not illustrated), and after the activation, the control IC 40 operates based on the power supply voltage Vcc.

The terminal GND receives a ground voltage, and is coupled to, for example, a housing and/or the like of a device in which the switching power supply circuit 10 is provided.

The terminal FB is a terminal at which a feedback voltage Vfb corresponding to the output voltage Vout is generated, and is coupled to the capacitor 53 and the phototransistor 57. The capacitor 53 is provided to remove noise between the terminal FB and the ground, and the phototransistor 57 passes a bias current I1 with a magnitude corresponding to the intensity of the light from the light-emitting diode 34, from the terminal FB to the ground. Thus, the phototransistor 57 operates as a transistor that generates a sink current.

The terminal IS receives a voltage corresponding to input power of the switching power supply circuit 10. Here, at a node at which the capacitor 50 and the resistor 54 are coupled, a voltage corresponding to a current value of a resonant current in the primary coil L1 is generated. And, the resistor 55 and the capacitor 51 configure a low-pass filter. Accordingly, a voltage that corresponds to the current value of the resonant current in the primary coil L1 and is obtained by removing a noise component is applied to the terminal IS. Note that the resonant current in the primary coil L1 corresponds to an "inductor current".

The current value of the resonant current increases according to the input power of the switching power supply circuit 10, and the input power of the switching power supply circuit 10 increases according to power consumed by the load 11. Accordingly, the voltage applied to the terminal IS indicates a voltage corresponding to the power consumption of the load 11.

The terminal HO is a terminal through which a drive signal Vdr1 to drive the NMOS transistor 22 is outputted, and which is coupled to a gate of the NMOS transistor 22.

The terminal LO is a terminal from which a drive signal Vdr2 to drive the NMOS transistor 23 is outputted and which is coupled to a gate of the NMOS transistor 23.

<<<Control IC 40>>>

Figure 2:
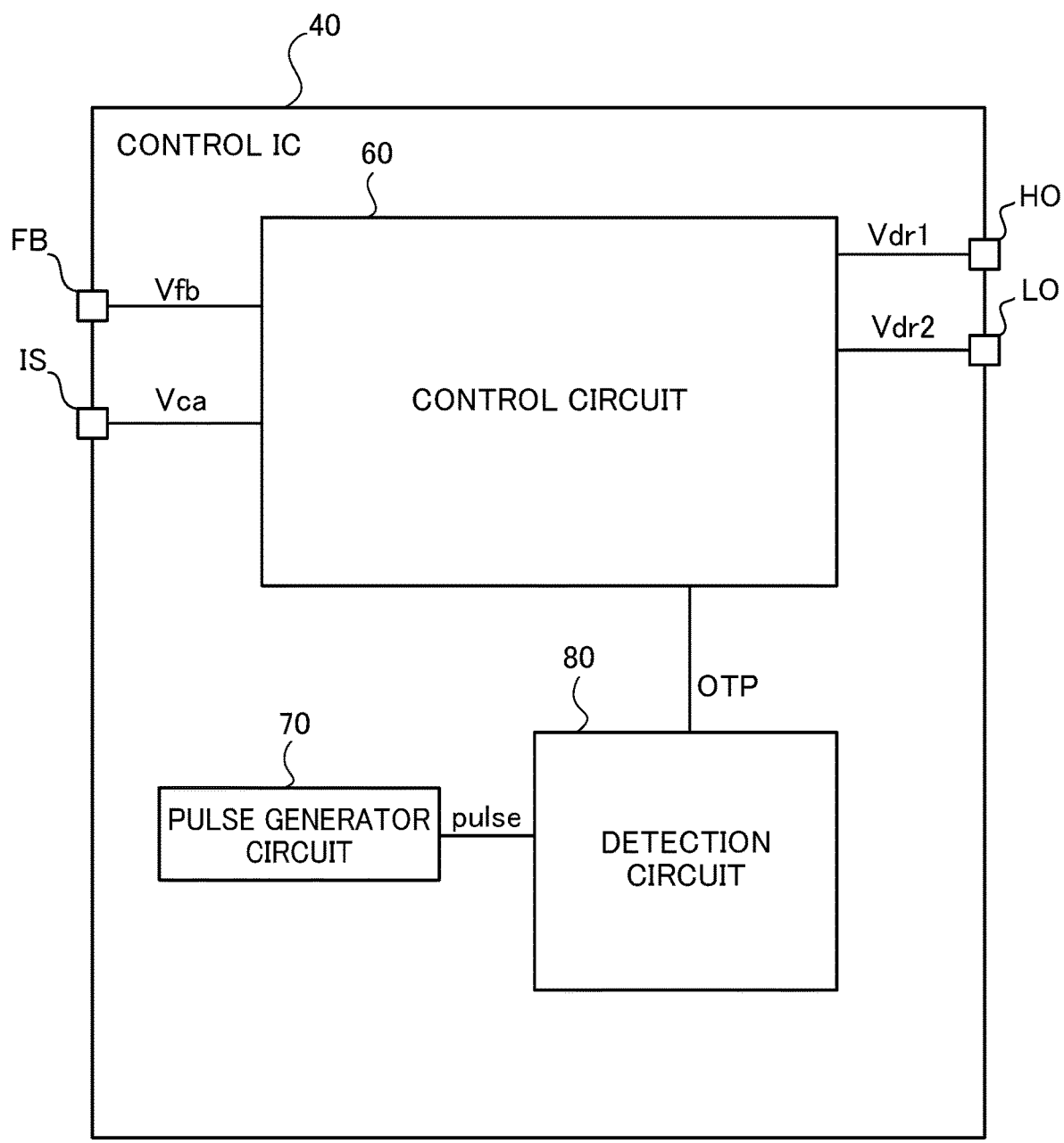
FIG. 2 is a diagram illustrating an example of a configuration of a control IC 40.

FIG. 2 is a diagram illustrating a configuration of the control IC 40. The control IC 40 includes a control circuit 60, a pulse generator circuit 70, and a detection circuit 80. In this figure, the terminals VCC and GND are omitted. Note that the control IC 40 corresponds to a "switching control circuit".

<<<<Control Circuit 60>>>>

Figure 3:
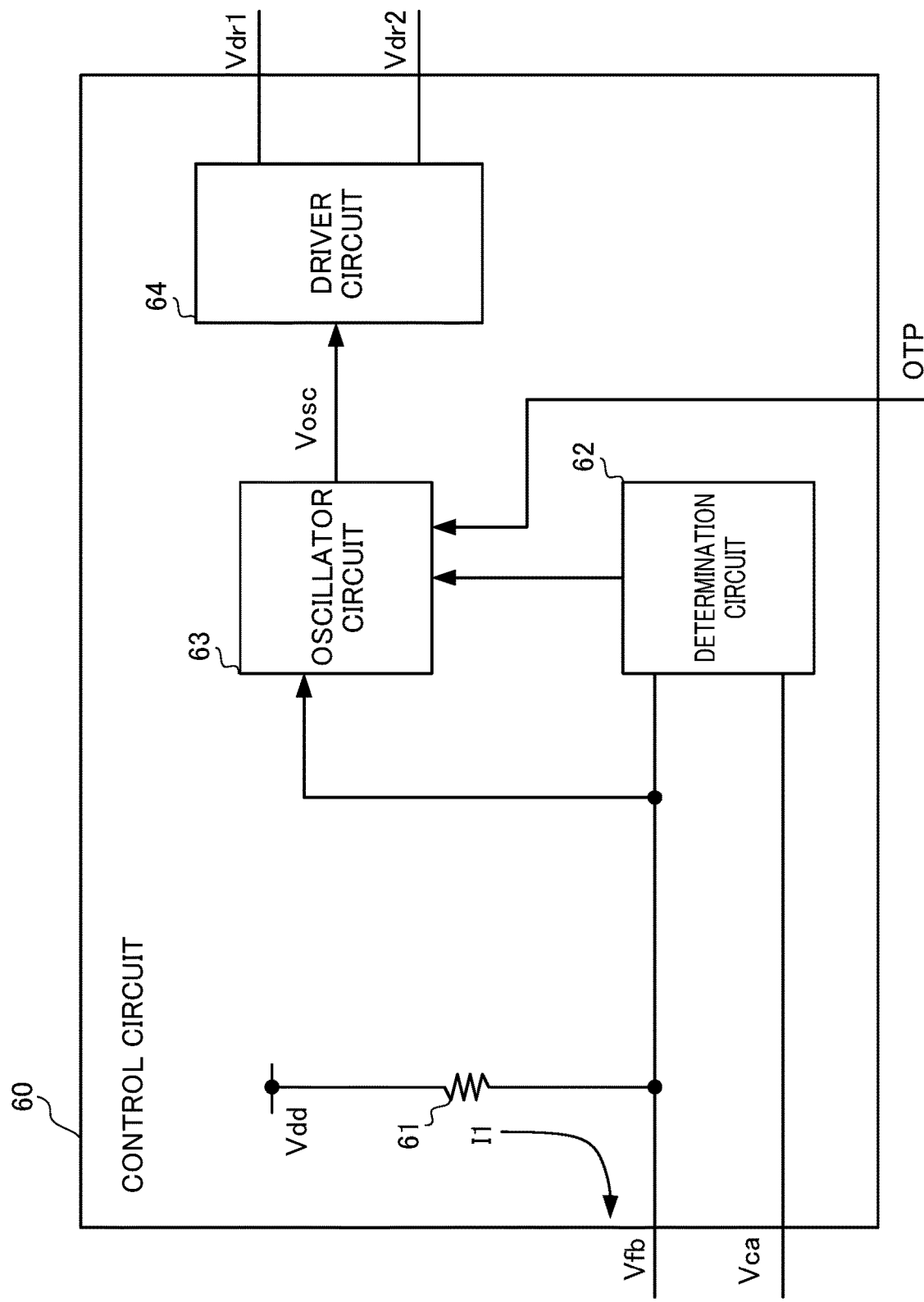
FIG. 3 is a diagram illustrating an example of a configuration of a control circuit 60.

FIG. 3 is a diagram illustrating a configuration of the control circuit 60. The control circuit 60 includes a resistor 61, a determination circuit 62, an oscillator circuit 63, and a driver circuit 64. The resistor 61 pulls up a line coupled to the terminal FB to a power supply voltage Vdd. An internal power supply circuit (not illustrated) in the control IC 40 generates the power supply voltage Vdd based on the voltage Vcc that is applied to the terminal VCC.

The determination circuit 62 determines whether the load 11 is a light load based on the feedback voltage Vfb and a voltage Vca, and determines a transition between a normal mode and a burst mode.

Here, in response to the load 11 being a light load, the output voltage Vout rises above the target level. Accordingly, for example, an internal input to the voltage regulator circuit 33 including the shunt regulator in FIG. 1 rises, and thus a large amount of current is passed through a transistor in the shunt regulator (not illustrated) such that the output voltage is made constant.

As a result, a large amount of current flows through the light-emitting diode 34 as well. Then, the phototransistor 57 allows the bias current I1 with a magnitude corresponding to the degree of amplification of the light from the light-emitting diode 34 to flow from the terminal FB to the ground, thereby lowering the feedback voltage Vfb.

For example, in response to the received feedback voltage Vfb being lower than the feedback voltage Vfb at a time when the output voltage Vout is at the target level, and also to the received voltage Vca being lower than a predetermined level serving as the reference for a light load, the determination circuit 62 determines that the load 11 is a light load and thus determines a transition to the burst mode.

On the other hand, in response to the output voltage Vout being higher than the feedback voltage Vfb at the time when the output voltage Vout is at a target level, or to the received voltage Vca being higher than the predetermined level serving as the reference for a light load, the determination circuit 62 determines that the load 11 is not a light load and thus determines a transition to the normal mode.

Note that the "normal mode" is, for example, a mode in which the control circuit 60 drives the NMOS transistors 22 and 23 continuously without intermittently driving them, and the "burst mode" is, for example, a mode in which the control circuit 60 drives the NMOS transistors 22 and 23 intermittently. The burst mode corresponds to a "first mode", and the normal mode corresponds to a "second mode".

A state in which the switching power supply circuit 10 is operating in the normal mode is a state in which the switching power supply circuit 10 is not operating in the burst mode. Accordingly, being during a normal mode operation means being during a non-burst mode operation.

The oscillator circuit 63 is a voltage control oscillator circuit that outputs an oscillator signal Vosc to switch the NMOS transistors 22 and 23 in response to the received feedback voltage Vfb and result of the determination of the determination circuit 62.

In response to the result of the determination the determination circuit 62 indicating the normal mode, the oscillator circuit 63 outputs the oscillator signal Vosc to continuously drive the NMOS transistors 22 and 23. On the other hand, in response to the result of the determination of the determination circuit 62 indicating the burst mode, the oscillator circuit 63 outputs the oscillator signal Vosc to intermittently drive the NMOS transistors 22 and 23.

The driver circuit 64 drives the NMOS transistors 22 and 23 at a frequency of the oscillator signal Vosc. Specifically, the driver circuit 64 outputs the pulsed drive signals Vdr1 and Vdr2 with the frequency of the oscillator signal Vosc and a constant duty ratio (for example, 50%), to the NMOS transistors 22 and 23, respectively.

The driver circuit 64 complementarily changes the drive signal Vdr1 and the drive signal Vdr2, with a dead time being provided such that the NMOS transistors 22 and 23 are not on concurrently.

Here, for example, in the operation in the normal mode, in response to the level of the output voltage Vout rising above the target level, the feedback voltage Vfb drops, and thus the frequency of the oscillator signal Vosc rises. As a result, the output voltage Vout of the switching power supply circuit 10, which is an LLC current resonant converter, drops.

On the other hand, in response to the level of the output voltage Vout dropping below the target level, the feedback voltage Vfb rises, and thus the frequency of the oscillator signal Vosc drops. As a result, the output voltage Vout of the switching power supply circuit 10 rises. Accordingly, the switching power supply circuit 10 can generate the output voltage Vout at the target level.

The operation in the burst mode is similarly performed. In addition, for example, the oscillator circuit 63 stops the oscillator signal Vosc in response to detecting a signal OTP from the detection circuit 80 (described later). In response to the oscillator circuit 63 receiving the signal OTP, the switching power supply circuit 10 stops the switching operation. This stops the NMOS transistor 22 and the NMOS transistor 23, thereby stopping the power supply to the load 11.

<<<<Pulse Generator Circuit 70>>>>

The pulse generator circuit 70 in FIG. 2 outputs a pulse signal "pulse" to the detection circuit 80 (described later) in response to a predetermined signal. For example, the pulse generator circuit 70 generates the pulse signal pulse with such a constant duty ratio that a time period during which the pulse signal pulse is at a high level (hereinafter, referred to as high or high level) is, for example, 10% of one cycle, in response to an output signal of a ring oscillator or another oscillator signal.

<<<<Configuration of Detection Circuit 80>>>>

Figure 4:
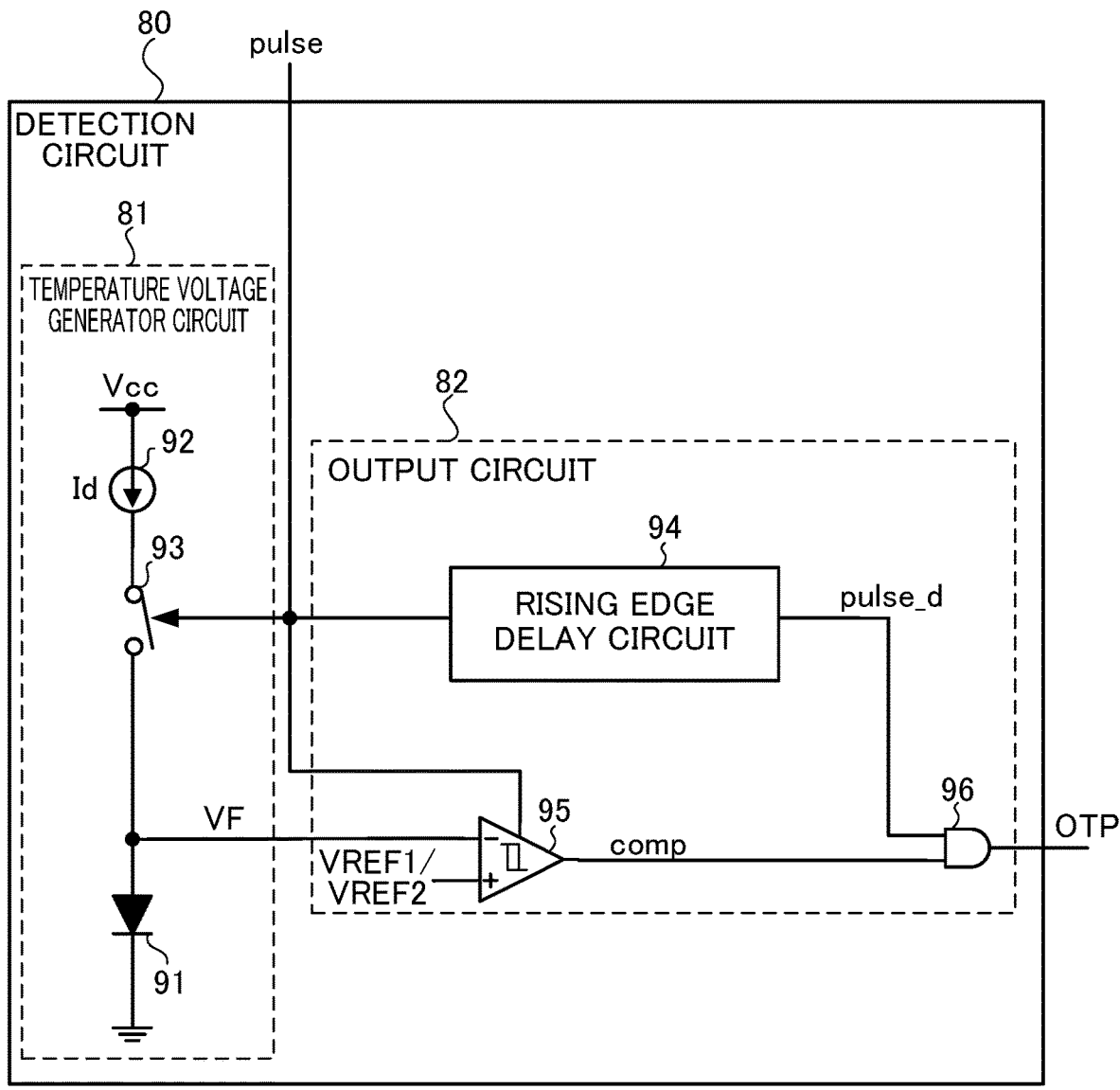
FIG. 4 is a diagram illustrating an example of a configuration of a detection circuit 80.

FIG. 4 is a diagram illustrating a configuration of the detection circuit 80. The detection circuit 80 detects the temperature in the control IC 40. The detection circuit 80 includes a temperature voltage generator circuit 81 and an output circuit 82.

The temperature voltage generator circuit 81 includes a diode 91, a constant current source 92 that receives the voltage Vcc and generates a forward current Id that is to be passed through the diode 91, and a switch 93 to intermittently pass the forward current Id through the diode 91. Intermittently passing the forward current Id through the diode 91 reduces self-heating of the diode 91, to thereby enable highly accurate temperature detection.

Note that the diode 91 corresponds to a "temperature detection element", and the forward current Id corresponds to a "predetermined current". Furthermore, examples of the "temperature detection element" include, in addition to a diode, a polysilicon resistor and/or the like that is used for a temperature sensor.

When the pulse signal pulse is high, the temperature voltage generator circuit 81 passes the forward current Id through the diode 91 and generates, as a detection voltage, a forward voltage VF of the diode 91 corresponding to the temperature. On the other hand, when the pulse signal pulse is at a low level (hereinafter, referred to as low or low level), the temperature voltage generator circuit 81 stops generating the forward voltage VF.

The forward voltage VF of the diode 91 has negative temperature characteristics, and thus in response to a rise in the temperature in the control IC 40, the forward voltage VF drops. On the other hand, in response to a drop in the temperature in the control IC 40, the forward voltage VF rises.

The constant current source 92 is a temperature-compensated constant current source passes the predetermined forward current Id through the diode 91 without depending on the temperature in the control IC 40. Specifically, the constant current source 92 generates a current using a reference voltage circuit (not illustrated), to thereby operate as a temperature-compensated constant current source.

When the pulse signal pulse from the pulse generator circuit 70 is high, the switch 93 is on, and the forward current Id that is passed by the constant current source 92 is supplied to the diode 91. On the other hand, when the pulse signal pulse is low, the switch 93 is off, and the supply of the forward current Id to the diode 91 is stopped.

The output circuit 82 outputs a detection signal indicating whether the temperature is higher than a "predetermined temperature To (for example, 140° C.)", until the pulse signal pulse from the pulse generator circuit 70 goes low after a "predetermined time period Tp" has elapsed since the pulse signal pulse going high. In other words, the output circuit 82 compares the forward voltage VF from the temperature voltage generator circuit 81 with a high reference voltage VREF1 and a low reference voltage VREF2 that correspond to the "predetermined temperature To", and outputs a comparison result comp as the signal OTP. The output circuit 82 includes a rising edge delay circuit 94, a hysteresis comparator 95, and an AND gate 96. Note that the signal OTP corresponds to a "detection signal".

Figure 5:
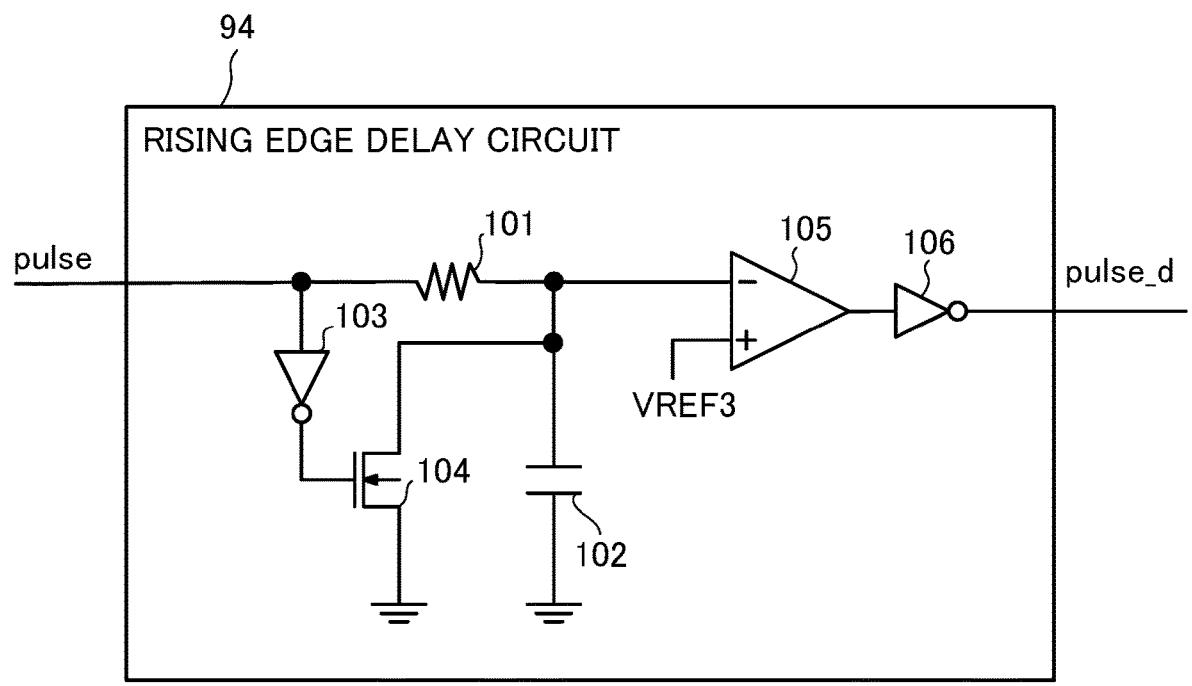
FIG. 5 is a diagram illustrating an example of a configuration of a rising edge delay circuit 94.

As illustrated in FIG. 5, the rising edge delay circuit 94 includes a resistor 101, a capacitor 102, an inverter 103, an NMOS transistor 104, a comparator 105, and an inverter 106. The resistor 101 and the capacitor 102 configure an integrator circuit that integrates the pulse signal pulse, and delay a rising edge of the pulse signal pulse by the "predetermined time period Tp".

The inverter 103 and the NMOS transistor 104 configure a discharge circuit to discharge charges accumulated in the capacitor 102. In response to the pulse signal pulse going low, the inverter 103 and the NMOS transistor 104 discharge the capacitor 102, to thereby lower the voltage applied to an inverting input terminal of the comparator 105.

The comparator 105 compares a voltage at one end of the capacitor 102 with a reference voltage VREF3, to output a result of the comparison. This result of the comparison is inverted by the inverter 106, resulting in a delayed pulse signal pulse_d.

Note that the rising edge delay circuit 94 corresponds to a "signal output circuit", and the delayed pulse signal pulse_d corresponds to a "predetermined signal".

Here, the "predetermined time period Tp" is determined by a time constant that is obtained based on a resistance value of the resistor 101 and a capacitance value of the capacitor 102. The "predetermined time period Tp" is longer than both a "first time period Ta" from when the pulse signal pulse goes high and the forward current Id is supplied until when the detection voltage corresponding to the temperature in the control IC 40 is generated, and a "second time period Tb" from when the pulse signal pulse goes high until when the comparison result comp from the hysteresis comparator 95 (described later) is outputted.

Referring again to FIG. 4, the hysteresis comparator 95 is activated in response to the pulse signal pulse going high, and compares the forward voltage VF from the temperature voltage generator circuit 81 with the high reference voltage VREF1 and the low reference voltage VREF2, to output the comparison result comp. The hysteresis comparator 95 outputs a low signal in response to the forward voltage VF being equal to or higher than the high reference voltage VREF1, and on the other hand, the hysteresis comparator 95 outputs a high signal in response to the forward voltage VF being equal to or lower than the low reference voltage VREF2. Note that the hysteresis comparator 95 corresponds to a "comparison circuit", and the high reference voltage VREF1 and the low reference voltage VREF2 correspond to a "reference voltage corresponding to a predetermined temperature".

The AND gate 96 implements a logical conjunction between a delayed pulse signal pulsed and the comparison result comp from the hysteresis comparator 95, and outputs the comparison result comp as the signal OTP only when the delayed pulse signal pulsed is high. Note that the AND gate 96 corresponds to a "logic circuit".

<<<<Operations of Pulse Generator Circuit 70 and Detection Circuit 80>>>>

The pulse generator circuit 70 generates the pulse signal pulse that oscillates with a constant frequency regardless of whether the switching power supply circuit 10 operates in the "normal mode" or in the "burst mode".

Figure 6:
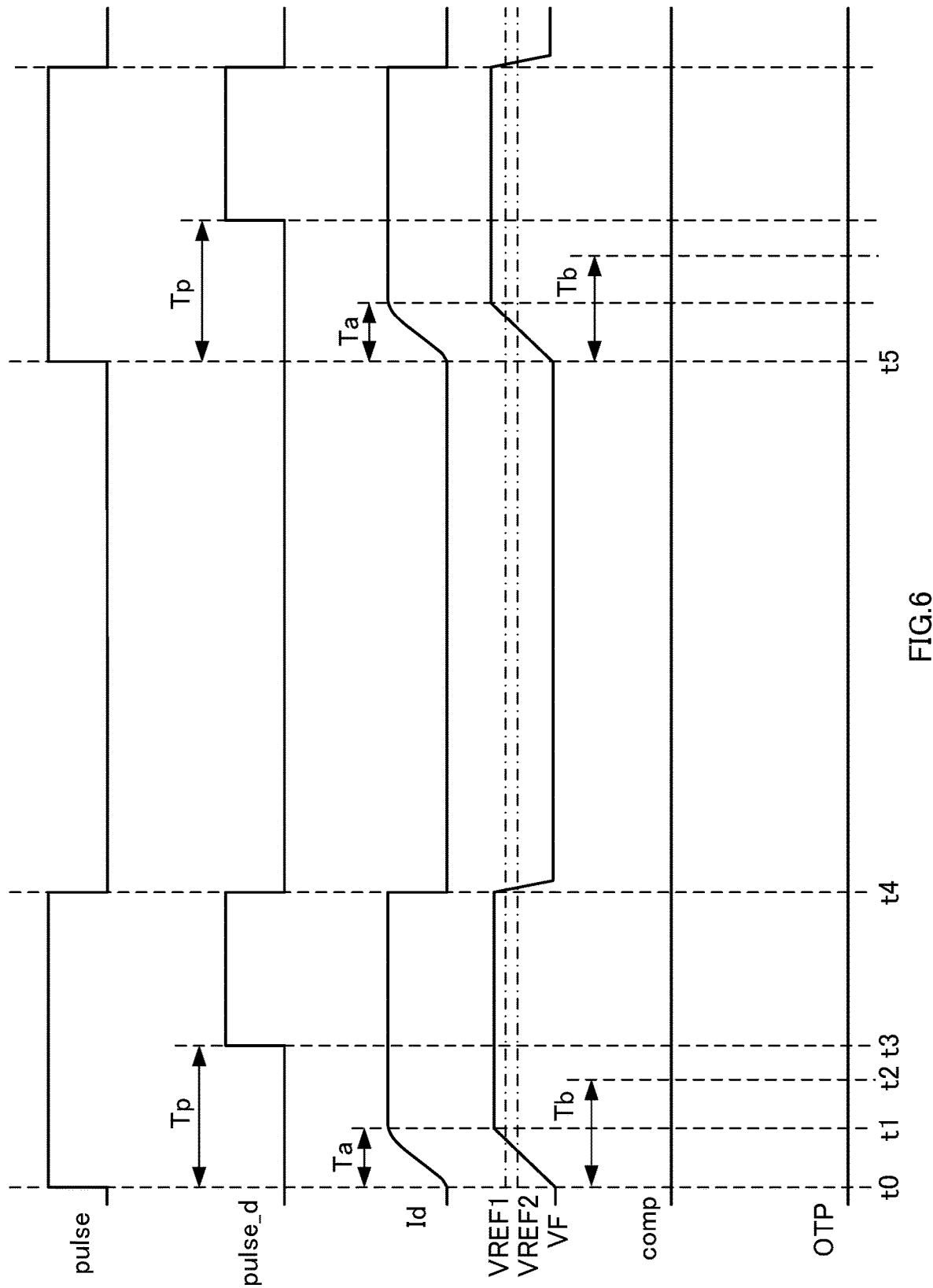
FIG. 6 is a diagram illustrating an example of an operation of a detection circuit 80 when the temperature in a control IC 40 is lower than a predetermined value.

FIG. 6 is a diagram illustrating an operation of the detection circuit 80 when the temperature in the control IC 40 is lower than the "predetermined temperature To (for example, 140° C.)" and the signal OTP does not go high. The pulse signal pulse is generated by the pulse generator circuit 70 and oscillates at a constant frequency. In response to the pulse signal pulse being inputted to the output circuit 82, the delayed pulse signal pulse_d obtained by delaying the pulse signal pulse by the "predetermined time period Tp" is generated. The delayed pulse signal pulse_d is generated such that it goes low in response to the pulse signal pulse going low.

At time t0, the high pulse signal pulse is inputted to the output circuit 82. At this time, in the temperature voltage generator circuit 81, the switch 93 is turned on, and thus the forward current Id is supplied to the diode 91 by the constant current source 92. Then, the activation of the hysteresis comparator 95 is started. The logic level of the pulse signal pulse being high corresponds to the pulse signal being at a "first level".

At time t1, the forward current Id reaches a predetermined value, and the predetermined forward current Id is supplied to the diode 91 by the constant current source 92. This results in the forward voltage VF of the diode 91 becoming a voltage corresponding to the temperature in the control IC 40. A time period from time t0 to time t1, which is the "first time period Ta" until when the forward current Id reaches a predetermined value and the voltage of the diode 91 reaches a voltage corresponding to the temperature, corresponds to a "first time period".

For example, in response to the hysteresis comparator 95 being activated at time t2, the hysteresis comparator 95 compares the forward voltage VF from the temperature voltage generator circuit 81 with the high reference voltage VREF1 and the low reference voltage VREF2, to output the comparison result comp. Note that a time period from time t0 to time t2, which is the "second time period Tb" until when the hysteresis comparator 95 outputs the comparison result comp, corresponds to a "second time period".

At time t3 at which the "predetermined time period Tp" has elapsed since time t0, the delayed pulse signal pulse_d goes high. At this time, the pulse signal pulse is high, the predetermined forward current Id flows through the diode 91, and the hysteresis comparator 95 outputs the comparison result comp.

Then, the hysteresis comparator 95 outputs, to the AND gate 96, the comparison result comp obtained by comparing the forward voltage VF from the temperature voltage generator circuit 81 with the high reference voltage VREF1 and the low reference voltage VREF2. Since the delayed pulse signal pulse_d is high, and the forward voltage VF of the diode 91 is higher than the high reference voltage VREF1, the AND gate 96 outputs the low signal OTP.

In response to the pulse signal pulse going low at time t4, the delayed pulse signal pulse_d also goes low. In response to the delayed pulse signal pulse_d going low, the level of the signal OTP from the AND gate 96 is maintained low. Note that the logic level of the pulse signal pulse being low corresponds to the pulse signal being at a "second level".

The pulse signal pulse goes high at time t5, and thereafter, the operation from time t0 to time t5 is repeated.

As described above, in an embodiment of the present disclosure, the constant current source 92 supplies the forward current Id to the diode 91 only when the pulse signal pulse is high. And, the temperature is detected only when the delayed pulse signal pulse_d, which is obtained by delaying the pulse signal pulse by the "predetermined time period Tp", is high. This makes it possible to stably detect the temperature while reducing the power consumption.

Figure 7:
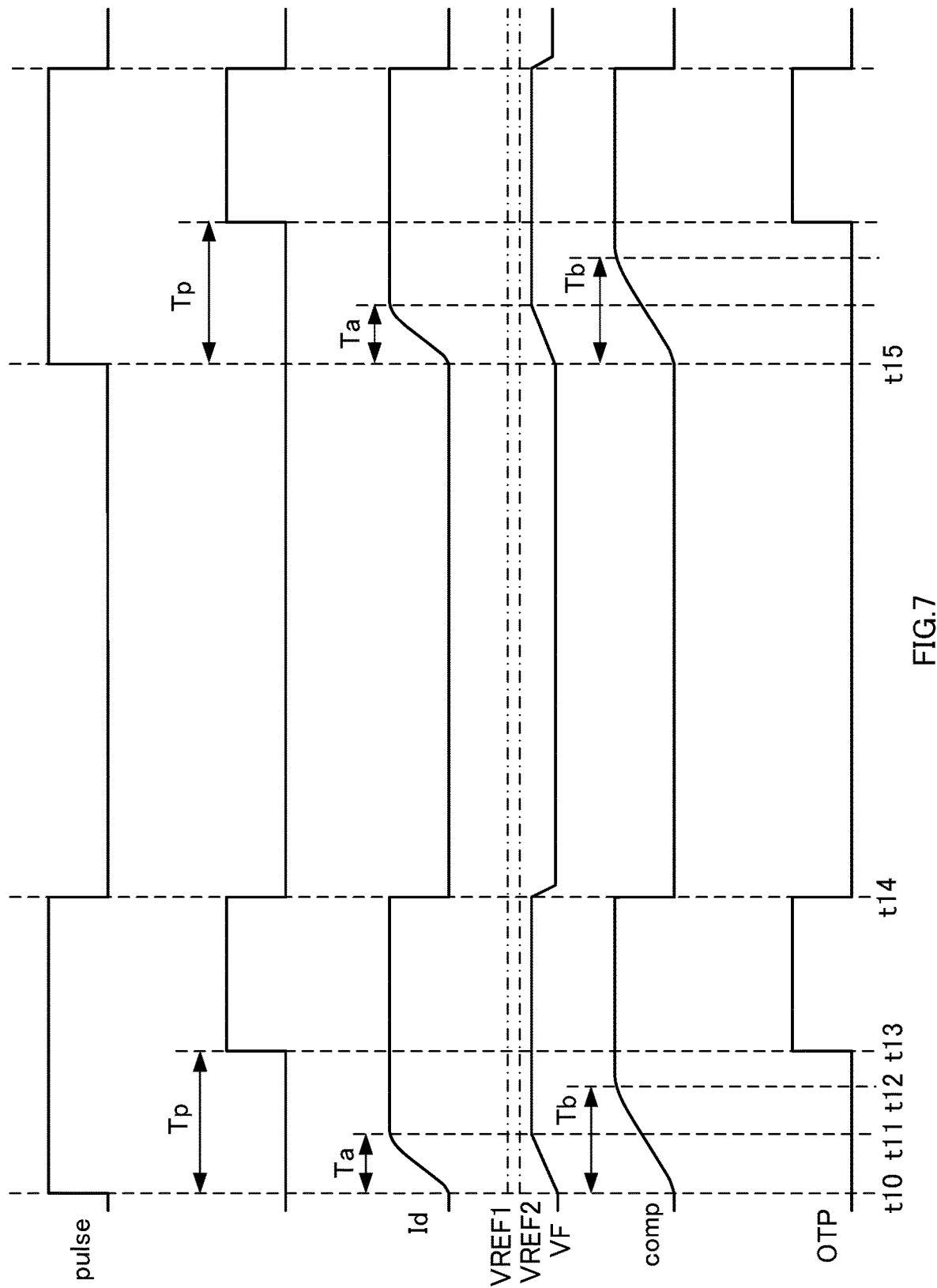
FIG. 7 is a diagram illustrating an example of an operation of a detection circuit 80 when a temperature in a control IC 40 is equal to or higher than a predetermined value.

FIG. 7 is a diagram illustrating an operation of the detection circuit 80 when the temperature in the control IC 40 is equal to or higher than the "predetermined temperature To (for example, 140° C.)" and the signal OTP goes high. The pulse signal pulse is generated as in FIG. 6.

At time t10, the high pulse signal pulse is inputted to the output circuit 82. At this time, in the temperature voltage generator circuit 81, the switch 93 is turned on, and thus the forward current Id is supplied to the diode 91 by the constant current source 92. Then, the activation of the hysteresis comparator 95 is started.

At time t11, the forward current Id reaches a predetermined value, and the predetermined forward current Id is supplied to the diode 91 by the constant current source 92. This results in the forward voltage VF of the diode 91 becoming a voltage corresponding to the temperature in the control IC 40.

For example, in response to the hysteresis comparator 95 being activated at time t12, the hysteresis comparator 95 compares the forward voltage VF from the temperature voltage generator circuit 81 with the high reference voltage VREF1 and the low reference voltage VREF2, to output the comparison result comp.

At time t13 at which the "predetermined time period Tp" has elapsed since time t10, the delayed pulse signal pulse_d goes high. At this time, the pulse signal pulse is high, the predetermined forward current Id flows through the diode 91, and the hysteresis comparator 95 outputs the high comparison result comp.

Then, the hysteresis comparator 95 outputs, to the AND gate 96, the comparison result comp obtained by comparing the forward voltage VF from the temperature voltage generator circuit 81 with the high reference voltage VREF1 and the low reference voltage VREF2. Since the delayed pulse signal pulse_d is high, and the forward voltage VF of the diode 91 is lower than the low reference voltage VREF2, the AND gate 96 outputs the high signal OTP.

In response to the pulse signal pulse going low at time t14, the delayed pulse signal pulse_d also goes low. In response to the delayed pulse signal pulse_d going low, the AND gate 96 outputs the low signal OTP.

The pulse signal pulse goes high at time t15, and thereafter, the operation from time t10 to time t15 is repeated.

As described above, detecting the temperature in the control IC 40 after the "predetermined time period Tp" has elapsed in response to the pulse signal pulse enables the detection circuit 80 to stably detect the temperature while reducing the power consumption.

Hereinabove, a description has been given assuming that the control IC 40 used in an LLC current resonant converter includes the detection circuit 80, however, the detection circuit 80 may be used in a control IC that controls a converter or the like that is other than an LLC current resonant converter.

===Modification===

Figure 8:
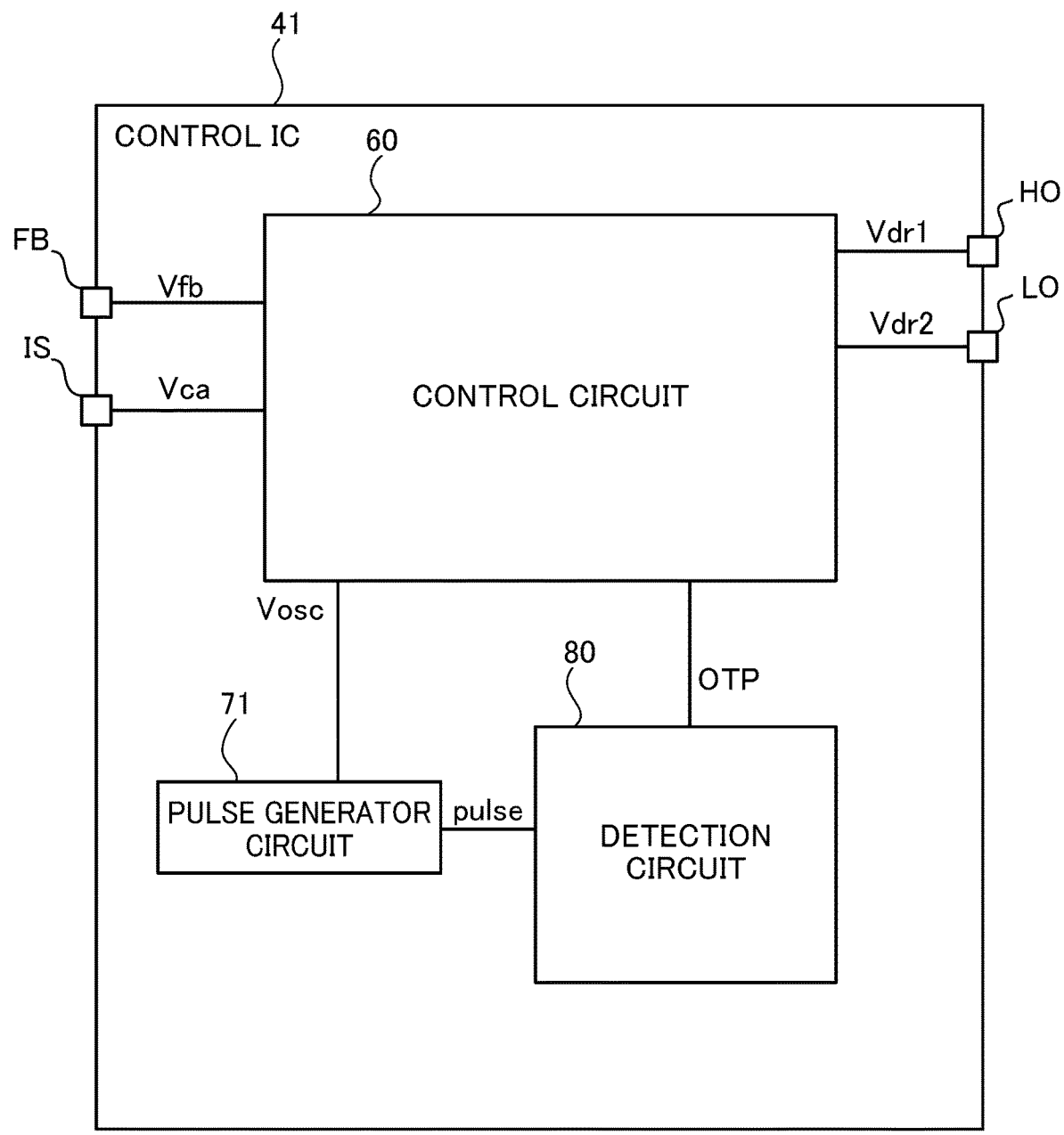
FIG. 8 is a diagram illustrating an example of a configuration of a control IC 41.

FIG. 8 is a diagram illustrating a configuration of a control IC 41 in a case where a pulse generator circuit 71 generates the pulse signal pulse in response to the signal Vosc. The control IC 41 may be used in place of the control IC 40. In FIG. 8, parts or elements that are the same as those in FIG. 2 are given the same reference signs.

In response to detecting a rising edge of the signal Vosc, for example, the pulse generator circuit 71 outputs the high pulse signal pulse, and in response to detecting a rising edge of the signal Vosc three times, for example, the pulse generator circuit 71 outputs the low pulse signal pulse.

In response to the pulse signal pulse going low, the pulse generator circuit 71 continues outputting the low pulse signal pulse at least nine times, for example, until a rising edge of the signal Vosc is detected.

Thereafter, in response to detecting a rising edge of the signal Vosc, for example, the pulse generator circuit 71 outputs the high pulse signal pulse again based on a rising edge of the signal Vosc, for example.

Figure 9:
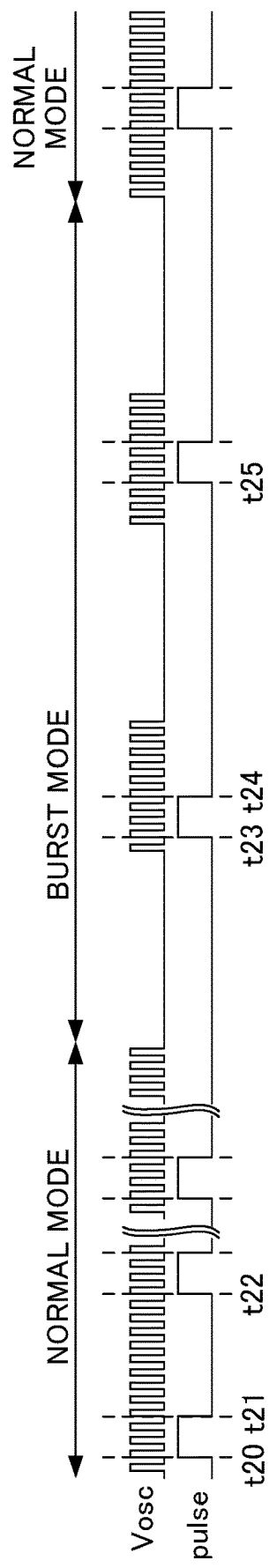
FIG. 9 is a diagram illustrating an operation of a pulse generator circuit 71.

With reference to FIG. 9, a description will be given of an operation when the pulse generator circuit 71 generates the pulse signal pulse in a cycle corresponding to the signal Vosc in response to the signal Vosc.

First, FIG. 9 illustrates how the pulse generator circuit 71 operates when the switching power supply circuit 10 operates in the "normal mode".

At time t20, in response to detecting a rising edge of the signal Vosc, for example, the pulse generator circuit 71 outputs the high pulse signal pulse. At time t21, in response to detecting a rising edge of the signal Vosc three times, for example, after time t20, the pulse generator circuit 71 outputs the low pulse signal pulse.

In response to the pulse signal pulse going low, the pulse generator circuit 71 continues outputting the low pulse signal pulse at least nine times, for example, until a rising edge of the signal Vosc is detected.

At time t22, in response to detecting a rising edge of the signal Vosc, for example, the pulse generator circuit 71 outputs the high pulse signal pulse again, and repeats the operation from time t20 to time t21.

Next, FIG. 9 also illustrates how the pulse generator circuit 71 operates when the switching power supply circuit 10 operates in the "burst mode".

At time t23, in response to detecting a rising edge of the signal Vosc, for example, the pulse generator circuit 71 outputs the high pulse signal pulse. At time t24, in response to detecting a rising edge of the signal Vosc three times, for example, after time t23, the pulse generator circuit 71 outputs the low pulse signal pulse.

In response to the pulse signal pulse going low, the pulse generator circuit 71 continues outputting the low pulse signal pulse at least nine times, for example, until a rising edge of the signal Vosc is detected.

At time t25, when detecting a rising edge of the signal Vosc, for example, the pulse generator circuit 71 outputs the high pulse signal pulse again, and repeats the operation from time t23 to time t24. In other words, the pulse generator circuit 71 outputs the high pulse signal pulse in response to the timing of the signal Vosc.

As described above, the pulse signal pulse is generated while the switching operation of the NMOS transistor 22 and the NMOS transistor 23 is performed in the "burst mode" and the "normal mode". Then, the cycle of the pulse signal pulse when the switching power supply circuit 10 operates in the "burst mode" is longer than the cycle of the pulse signal pulse when the switching power supply circuit 10 operates in the "normal mode".

SUMMARY

The switching power supply circuit 10 according to embodiments of the present disclosure has been described above. The detection of the temperature in the control IC 40 after a lapse of the "predetermined time period Tp" in response to the pulse signal pulse enables the detection circuit 80 to stably detect the temperature while reducing the power consumption.

In addition, with the constant current source 92, which is capable of passing the temperature-compensated forward current Id, being used when the forward current Id is passed through a temperature detection element, an accurate detection result can be obtained.

Moreover, intermittently passing the forward current Id through the diode 91 can reduce self-heating of the diode 91, to thereby enable highly accurate temperature detection.

Furthermore, with the output circuit 82 including the rising edge delay circuit 94, it is possible to delay a rising timing of the pulse signal pulse by a predetermined time period. The predetermined time period results in a waiting time for the constant current source 92 to pass the forward current Id or for the hysteresis comparator 95 to output the comparison result comp.

In addition, with the predetermined time period being set longer than a time period for the constant current source 92 and the hysteresis comparator 95 to stably operate, it is possible to increase the accuracy of detecting the temperature.

Moreover, with the detection circuit 80 being used in a switching control circuit that is used in a power supply circuit, a malfunction caused by heat can be prevented.

Furthermore, with a cycle of generating the pulse signal pulse being set to a predetermined cycle, it is possible to measure the temperature in the control IC 40 even when a load is a light load. This makes it possible to prevent a malfunction of the control IC 40 even when a load is a light load since the temperature is constantly detected every predetermined period even when unexpected heat is generated.

Additionally, with the pulse signal pulse being generated based on a cycle of an oscillator signal, which is a basis of a drive signal for driving the NMOS transistors 22 and 23, it is possible to implement the temperature detection in consideration of heat generation caused by load changes.

The present disclosure is directed to provision of a technique of stably detecting the temperature while reducing the power consumption.

According to the present disclosure, it is possible to provide a technique of stably detecting the temperature while reducing the power consumption.

Embodiments of the present disclosure described above are simply to facilitate understanding of the present disclosure and are not in any way to be construed as limiting the present disclosure. The present disclosure may variously be changed or altered without departing from its essential features and encompass equivalents thereof.

What is claimed is:

1. A detection circuit that receives a pulse signal, comprising:
a temperature voltage generator circuit configured to
generate a detection voltage corresponding to a temperature of the detection circuit, based on a predetermined constant current, when the pulse signal is at a first level, and
stop generating the detection voltage, when the pulse signal is at a second level; and
an output circuit configured to
output a detection signal indicating whether the temperature is higher than a predetermined temperature based on the detection voltage, during a period of time between
a first time that is a predetermined time period after the pulse signal reaches the first level,
and
a second time at which the pulse signal switches from the first level to the second level, the pulse signal remaining in the first level in the period of time.

2. The detection circuit according to claim 1, wherein the temperature voltage generator circuit includes
a constant current source configured to generate the predetermined constant current,
a temperature detection element, and
a switch configured to
start supplying the predetermined constant current to the temperature detection element, when the pulse signal is at the first level, and
stop supplying the predetermined constant current to the temperature detection element, when the pulse signal is at the second level.

3. The detection circuit according to claim 2, wherein the temperature detection element is a diode.

4. The detection circuit according to claim 1, wherein the output circuit includes
a signal output circuit configured to output a predetermined signal during the period of time,
a comparison circuit configured to
be activated in response to the pulse signal reaching the first level, and
compare the detection voltage with a reference voltage corresponding to the predetermined temperature, to output a result of the comparison, and a logic circuit configured to output the result of the comparison as the detection signal in response to the predetermined signal being at a predetermined level.

5. The detection circuit according to claim 4, wherein the predetermined time period is longer than both
a first time period from when the pulse signal reaches the first level and the predetermined constant current is supplied until when the detection voltage is generated, and
a second time period from when the pulse signal reaches the first level until when the result of the comparison is outputted.

6. A switching control circuit configured to control switching of a switching device that is configured to control an inductor current flowing through an inductor in a power supply circuit, the switching control circuit comprising:
a determination circuit configured to determine whether a load of the power supply circuit is a light load;
an oscillator circuit configured to output an oscillator signal
to drive the switching device in a first mode, when the load is the light load, and
to drive the switching device in a second mode, when the load is not the light load;
a driver circuit configured to drive the switching device in response to the oscillator signal;
a pulse generator circuit configured to generate a pulse signal;
a temperature voltage generator circuit configured to
generate a detection voltage corresponding to a temperature of the switching control circuit, based on a predetermined constant current, when the pulse signal is at a first level, and
stop generating the detection voltage, when the pulse signal is at a second level; and
an output circuit configured to output a detection signal indicating whether the temperature is higher than a predetermined temperature based on the detection voltage, during a period of time between
a first time that is a predetermined time period after the pulse signal reaches the first level,
and
a second time at which the pulse signal switches from the first level to the second level,
the pulse signal remaining in the first level in the period of time, wherein
the oscillator circuit, upon receiving the detection signal indicative that the temperature is higher than the predetermined temperature, causes a switching operation of the switching device to stop.

7. The switching control circuit according to claim 6, wherein the pulse generator circuit generates the pulse signal in a predetermined cycle.

8. The switching control circuit according to claim 6, wherein
the pulse generator circuit generates the pulse signal, in a cycle corresponding to a cycle of the oscillator signal, in response to the oscillator signal, and
the pulse signal is generated while the switching operation of the switching device is performed in the first and the second modes.

9. A power supply circuit, comprising:
a transformer including a primary coil provided on a primary side of the power supply circuit and a secondary coil provided on a secondary side of the power supply circuit;
a switching device configured to control a current in the primary coil; and
a switching control circuit configured to control switching of the switching device, wherein
the power supply circuit is configured to generate, on the secondary side thereof, an output voltage at a target level; and
the switching control circuit includes:
an oscillator circuit configured to output an oscillator signal to drive the switching device,
a driver circuit configured to drive the switching device in response to the oscillator signal,
a pulse generator circuit configured to generate a pulse signal,
a temperature voltage generator circuit configured to
generate a detection voltage corresponding to a temperature of the switching control circuit, based on a predetermined constant current, when the pulse signal is at a first level, and
stop generating the detection voltage, when the pulse signal is at a second level, and
an output circuit configured to output a detection signal indicating whether the temperature is higher than a predetermined temperature based on the detection voltage, during a period of time between
a first time that is a predetermined time period after the pulse signal reaches the first level,
and
a second time at which the pulse signal
switches from the first level to the second level, the pulse signal remaining in the first level in the period of time, wherein
the oscillator circuit, upon receiving the detection signal indicative that the temperature is higher than the predetermined temperature, causes a switching operation of the switching device to stop.

* * * * *